United States Patent
Van Der Sluid et al.

(10) Patent No.: US 8,600,634 B2
(45) Date of Patent: Dec. 3, 2013

(54) METHOD FOR CONTROLLING A NORMAL FORCE IN A FRICTIONAL CONTACT OF A CONTINUOUSLY VARIABLE TRANSMISSION

(75) Inventors: Francis Maria Antonius Van Der Sluid, Sint-michielsgestel (NL); Erik Van Der Noll, Dordrecht (NL); Antonius Adrianus Helena Maria Van Dongen, Gitze (NL); Robert Godefridus Matheus Verscheijden, Weert (NL)

(73) Assignee: Robert Bosch GmbH, Stuttgart (DE)

( * ) Notice: Subject to any disclaimer, the term of this patent is extended or adjusted under 35 U.S.C. 154(b) by 357 days.

(21) Appl. No.: 13/119,999

(22) PCT Filed: Sep. 26, 2008

(86) PCT No.: PCT/NL2008/050623
§ 371 (c)(1),
(2), (4) Date: Jun. 7, 2011

(87) PCT Pub. No.: WO2010/036099
PCT Pub. Date: Apr. 1, 2010

(65) Prior Publication Data
US 2011/0237369 A1    Sep. 29, 2011

(51) Int. Cl.
*G06F 17/00* (2006.01)
(52) U.S. Cl.
USPC .............. 701/61; 701/51; 701/58; 701/60; 474/8; 474/11; 474/18; 474/69; 474/70
(58) Field of Classification Search
USPC ............ 701/51, 58, 60, 61; 474/8, 11, 18, 69, 474/70
See application file for complete search history.

(56) References Cited

U.S. PATENT DOCUMENTS

| | | | | |
|---|---|---|---|---|
| 4,673,378 A | * | 6/1987 | Tokoro et al. | 474/18 |
| 5,052,980 A | * | 10/1991 | Itoh et al. | 474/11 |

(Continued)

FOREIGN PATENT DOCUMENTS

| | | |
|---|---|---|
| DE | 19959470 A1 | 6/2000 |
| EP | 1236935 A2 | 9/2002 |
| WO | 2006/063547 A1 | 6/2006 |
| WO | 2009007450 A2 | 1/2009 |

OTHER PUBLICATIONS

International Search Report, dated Oct. 23, 2009, from corresponding PCT application.

*Primary Examiner* — Thomas Black
*Assistant Examiner* — Donald J Wallace
(74) *Attorney, Agent, or Firm* — Young & Thompson

(57) ABSTRACT

A method is provided for controlling a normal force in a frictional contact of a continuously variable transmission including an input pulley and an output pulley where between an endless transmission element is arranged that is held between and in frictional contact with two pulley discs of each respective pulley under the influence of a respective normal force, wherein, as part the control method, the normal force at one pulley is actively oscillated, wherein a resulting oscillation of one of, or a ratio or difference between both of, a rotational speed of the input pulley and a rotational speed of the output pulley is determined and wherein at least one normal force is controlled in dependency on a correlation between the active oscillation and the resulting oscillation. The method includes a calibration step wherein a phase difference between the active oscillation and the resulting oscillation is determined.

18 Claims, 3 Drawing Sheets

(56) References Cited

U.S. PATENT DOCUMENTS

Figure 1:
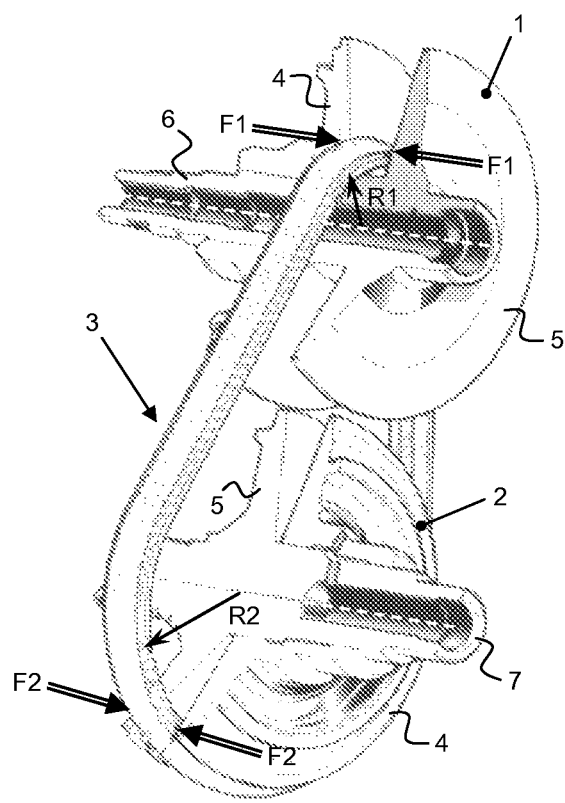

| | | | | |
|---|---|---|---|---|
| 5,182,968 A | * | 2/1993 | Mott | 474/11 |
| 5,871,411 A | * | 2/1999 | Senger et al. | 474/11 |
| 6,086,506 A | | 7/2000 | Petersmann et al. | |
| 6,283,893 B1 | | 9/2001 | Fritzner et al. | |
| 7,806,790 B2 | * | 10/2010 | Iwatsuki et al. | 474/12 |
| 8,221,286 B2 | * | 7/2012 | Van Der Noll | 474/62 |
| 2004/0018903 A1 | * | 1/2004 | Takagi | 474/8 |
| 2004/0225429 A1 | * | 11/2004 | Keim et al. | 701/51 |
| 2006/0105867 A1 | * | 5/2006 | Reuschel | 474/18 |
| 2006/0166768 A1 | * | 7/2006 | Reuschel | 474/8 |
| 2008/0004157 A1 | | 1/2008 | Reuschel | |
| 2012/0108374 A1 | * | 5/2012 | Doihara et al. | 474/28 |
| 2012/0252612 A1 | * | 10/2012 | Kodama et al. | 474/69 |
| 2012/0258825 A1 | * | 10/2012 | Kodama et al. | 474/69 |

* cited by examiner

METHOD FOR CONTROLLING A NORMAL FORCE IN A FRICTIONAL CONTACT OF A CONTINUOUSLY VARIABLE TRANSMISSION

The present invention relates to a method for controlling a normal force in a frictional contact of a continuously variable transmission or CVT, which transmission is typically applied in the drive line of a motorised vehicle for transmitting a drive torque between the engine and the driven wheels thereof at a continuously variable speed and torque transmission ratio. Each such transmission comprises at least two rotatably arranged friction surfaces that can be brought into engagement, i.e. in frictional contact, such that a normal force is effected there between. Hereby, a first or rotationally driving friction surface can exert a tangentially oriented friction or driving force on a second or rotationally driven friction surface. In one known example of the CVT, these two types of friction surfaces are represented by, on the one hand, the conical surface of a pulley disc and, on the other hand, the slanted side surface of a drive belt of the transmission, which belt is wrapped around two pulleys of the transmission while being clamped between the pulley discs thereof. In more general terms the drive belt is also referred to as an, longitudinally flexible, endless transmission means.

In the known CVT, typically, the said normal force is realised by exerting a controllable hydraulic pressure in a piston-cylinder-assembly associated with an axially moveable disc of a respective pulley. By this pressure an axially oriented, so-called clamping force is exerted on the drive belt by both pulley discs, whereby the normal force is represented by a force component of the clamping force that is determined by the cone angle of the pulley discs in a manner that is well-known in the art.

It is further well-known in the art that the efficiency and/or durability of the transmission may be improved if the said normal force is controllable during operation of the transmission, i.e. is adjustable in relation to one or more operational parameters of the transmission such as the said drive torque to be transmitted thereby. One specific method for controlling the applied normal force is described in the non-prepublished international patent application number EP2008/059092. In relation to the generally known belt-and-pulley type CVT it is described therein to control the said normal force in relation to the instantaneous correlation between a naturally occurring or forced oscillation or periodic change of the normal force at a transmission pulley and the resulting oscillation of one of, or a ratio or difference between both of a rotational speed of the input or driving pulley and a rotational speed of the output or driven pulley. Preferably, the said ratio, i.e. the speed ratio of the transmission is used.

More in particular according to EP2008/059092, the multiplication product of two (electric) signals that respectively represent the normal force oscillation and the speed ratio oscillation is determined and the normal force—that is to say: the effective or (time) average magnitude thereof- is lowered when such multiplication yields a positive value and it is raised when such multiplication yields a negative value. At least when the said multiplication product is equal to zero, but preferably also in a tolerance band around zero, the effective normal force is left unchanged.

In this way, the above control method automatically converges towards or 'locks in on' an effective normal force level that provides a very good, if not optimum efficiency of the torque transmission by the CVT. This control method is to be favoured principally, since thereby the actually applied, effective normal force is controlled directly in relation to the drive torque to a favourably minimal level, even without the need to actually measure such drive torque. Moreover, by adding a negative offset to (the signal representing) the multiplication product, the thus controlled effective normal force can be increased for surely avoiding any excessive mutual tangential movement or slip between the said friction surfaces. As a result, the control method can be easily adjusted in response to the instantaneous or predetermined operational parameters of the transmission. Further, the algorithm and the measurement means or sensors required for the control method are relatively uncomplicated and/or are readily available and may thus be implemented in a cost effective manner.

In the art several other control methods are available, which are likewise based on or at least include the step of applying an oscillation to the effective normal force that is exerted on the drive belt by one, usually the output or driven one, of the transmission pulleys. In each case the magnitude or amplitude of the said oscillation can be small in comparison to the effective or (time) average magnitude thereof, e.g. amount to only 10% of the effective magnitude or less.

According to the present invention, these control methods that rely on the said forced oscillation of the normal force at one of the pulleys can be improved further, in particular in terms of their control accuracy. More in particular, in the above control method, a time delay or phase-shift, i.e. phase difference, was found to occur between the forced normal force oscillation and the resulting speed ratio oscillation, even at a high level of the effective normal force relative to the torque transmitted by the transmission, i.e. when no or only a negligible amount of slip occurs in the transmission. This phase-shift causes a negative offset in the said multiplication product, which—as explained in the above—need not be detrimental to the transmission control per se. However, this inherently present—i.e. occurring as an artefact of the physical transmission system—negative offset is considered undesirable nonetheless, because it was found to be of a considerable magnitude. Thus, as a result of such inherent or basic phase-shift, the controlled effective normal force may in practice not provide optimum transmission efficiency at all. Actually, the inherent phase-shift could, at least theory, become so large that the sign of the said multiplication product (positive or negative) is changed thereby, which would cause the exact opposite and thus incorrect control action to be taken in response thereto and the control method would fail control the transmission altogether.

Inter alia, it is remarked that the said inherent said phase-shift is attributed to the inertia and elasticity of certain parts or components of the transmission, in particular of the pulleys thereof.

The existing control methods can thus be improved by at least partly taking into account and compensating for the said inherent phase-shift. According to the invention such is accomplished by including in the existing control methods the steps of (1) (pre-)determining the inherent phase-shift and of (2) compensating for such determined inherent phase-shift by adapting either one or all of the transmission speed ratio, the speed ratio signal, the normal force signal and the multiplication signal in dependency thereon.

According to the invention the inherent phase-shift is to be determined while maintaining the effective normal force in the frictional contact between the belt and the pulley discs at a level that is sufficient for ensuring that no or only a negligible amount of slip occurs there between, e.g. less than 0.5% of their absolute (rotational) speed. In these circumstances the detected phase shift will indeed be predominantly determined by the physical transmission system and will not be influenced by any effect possibly related to the said slip. In this respect it is possible, in accordance with the invention, to predetermine the inherent phase shift, for example by programming a fixed parameter value into the transmission control system or by determining it only once during initial operation or even as part of the manufacturing of the transmission.

A mathematical model may be employed to adapt such predetermined inherent phase shift during operation of the transmission in response to operational parameters thereof. Typically, however, an even more accurate control method may be realised if the inherent phase shift is determined and updated during operation of the transmission, for example by interrupting the execution of the existing control method and temporarily increase the effective normal force to allow the inherent phase-shift to be reliably and accurately determined.

Further according to the invention, the thus determined inherent phase-shift may be compensated for in the following three separate ways, either exclusively or by a suitable combination thereof. Firstly, the physical transmission speed ratio may be adapted by additionally forcing the normal force at the respective other one transmission pulley, usually the input or driving pulley, to oscillate at the same frequency as the force oscillation at the said one transmission pulley, usually the output or driven one. As a result the phase and the amplitude of the speed ratio oscillation will be influenced in dependency on the parameters of a phase-shift (i.e. relative phase or phase difference) and/or an amplitude difference between the said normal force oscillations at the respective pulleys. The two parameters of phase-shift and amplitude difference may thus be used, i.e. may be varied, to bring the speed ratio oscillation in tune with the normal force oscillation at the said one transmission pulley, thereby removing the said inherent phase-shift. Preferably, however, the amplitudes of the said normal force oscillations are set about equal with the said phase-shift between the said normal force oscillations being controlled so as to compensate for, i.e. remove the said inherent phase-shift.

Incidentally, it is noted that the above-described, first option for compensating the inherent phase-shift comes with the additional advantage that an influence of the type and/or operation of the hydraulic control system of the transmission on the functioning of the present control method, which may otherwise occur, is reduced considerably. For example, in practice the said normal forces at the respective pulleys may each be realised independently by means of a respective hydraulic pressure that is actively controlled based on a respective desired value and a respectively measured value, which latter measured value is inputted in the control system by means of feed-back. At least at the respective other one pulley, such active normal force/pressure control might undesirably respond to and influence, in particular dampen, the said speed ratio oscillation. It is even conceivable that, by the control of the normal force/pressure at the said other one pulley, the said speed ratio oscillation induced by the normal force/pressure oscillation at the said one pulley is counteracted entirely, i.e. is removed altogether. By forcing both said normal forces/pressures to oscillate at the same frequency, such dampening effect is effectively reduced and possibly even removed entirely. For this latter purpose the said normal forces/pressures may in principle be oscillated in tune, i.e. in phase. However, for additionally realising the former purpose of compensating for the inherent phase-shift, the said phase-shift will normally have to be applied there between.

Secondly, the speed ratio signal and/or the normal force signal may be adapted by advancing in relation to time the speed ratio signal relative to the normal force signal by an amount corresponding to the (pre-)determined inherent phase-shift, preferably by delaying the normal force signal. The time delay required to be applied to the normal force signal may be determined by dividing the inherent phase-shift by the frequency of the normal force oscillation, at least when the inherent phase-shift is expressed as a fraction of the repetition period of the normal force oscillation, i.e. of one full cycle thereof.

Thirdly, the multiplication signal may be adapted by adding a positive offset thereto, which offset corresponds to the negative offset provided by the said inherent phase-shift. If, additionally, a negative offset is desired to be applied for adjusting the existing control method in the above-described manner, the resulting total offset to be applied to the multiplication signal is determined by the sum of such negative offset and the positive offset in accordance with the present invention.

Figure 2:
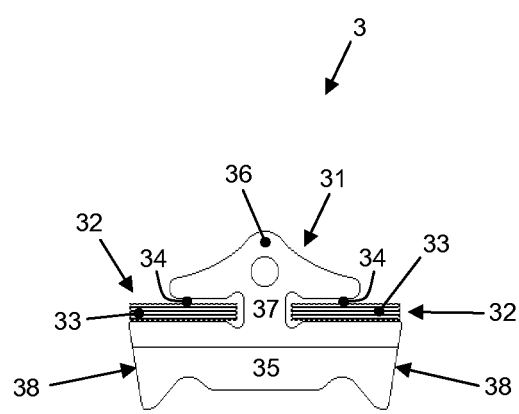
Figure 3:
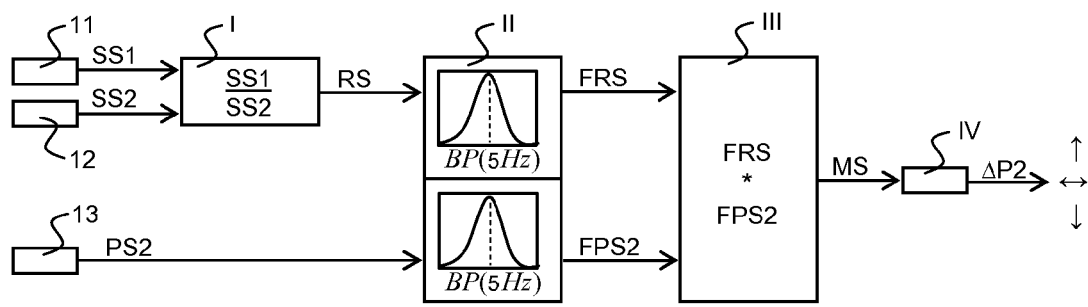
Figure 4:
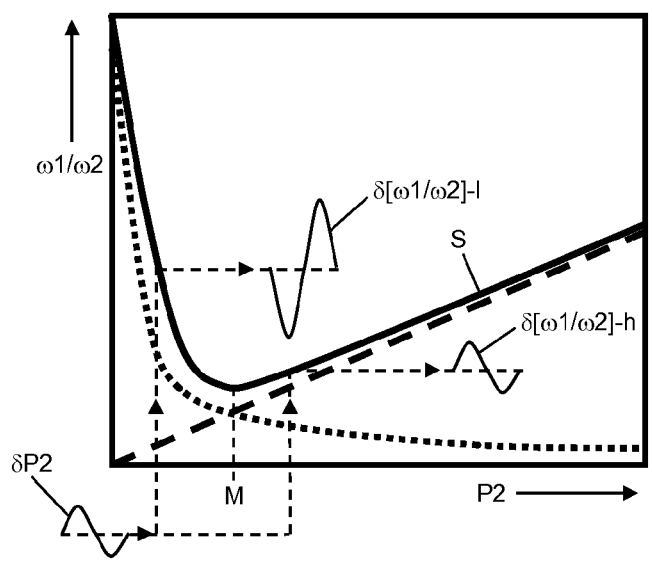
Figure 5:
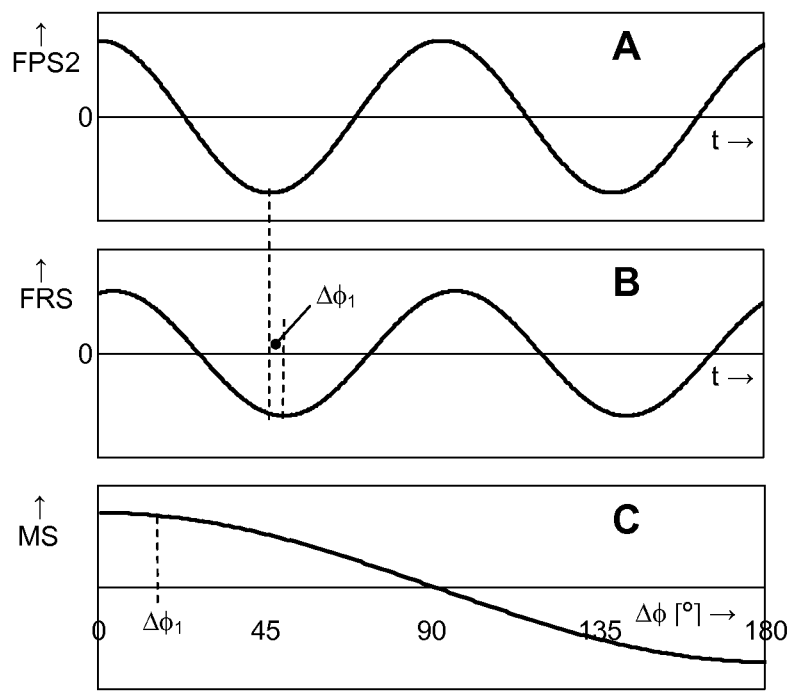
Figure 6:
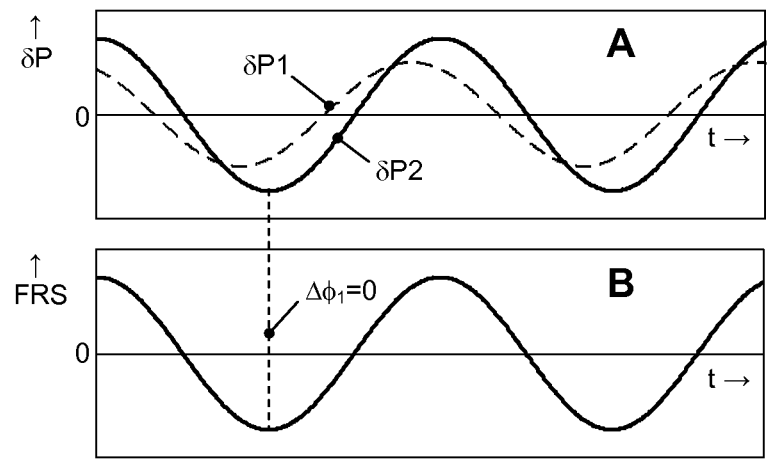

The invention will now be elucidated further along a preferred embodiment thereof and as illustrated by the drawing figures, whereof:

FIG. 1 provides a basic layout of a known type of continuously variable transmission with two pulleys and a drive belt, FIG. 2 provides a cross-section in longitudinal direction of the drive belt, FIG. 3 illustrates the currently considered control method by way of a block diagram, FIG. 4 illustrates the functioning of the currently considered control method by way of a graph, FIG. 5 illustrates a feature of the currently considered control method by way of a graph, FIG. 6 illustrates the improved control method according to the present invention.

FIG. 1 provides a perspective view of the basic parts of the known continuously variable transmission or CVT that comprises two pulleys 1, 2 and a drive belt 3 that is wrapped around and in frictional contact with the pulleys 1, 2. The pulleys 1, 2 are each provided with two conical discs 4, 5 on a respective pulley shaft 6 or 7, between which discs 4, 5 a tapered groove of variable width is defined that accommodates a part of the drive belt 3 that is bent in its longitudinal direction, whereby an effective radius of contact R1, R2 exists there between. At least one disc 4 of each pulley 1 and 2 is axially movable towards the respective other disc 5, e.g. by means of a piston/cylinder-assembly (not shown) that associated with each respective pulley, for exerting a respective axially oriented clamping force F1, F2 on the belt 3. Because of the conical shape of the pulley discs 4, 5 these clamping forces F1, F2 are split in a first force component perpendicular or normal to the frictional contact between belt 3 and pulleys 1, 2 and a radially oriented second component by which the belt 3 is tensioned. The level of a respective normal force component Fn1, Fn2 determines the driving force that can be transferred between the belt 3 and the respective pulley 1 or 2 by means of friction, whereas the ratio Fn1/Fn2 there between determines and is used to control the effective contact radii R1 and R2 between the belt 3 and the respective pulleys 1 and 2. In FIG. 1 the CVT is depicted in the largest possible speed ratio $\omega1/\omega2$ that is defined as the quotient of a transmission input speed $\omega1$ (i.e. the rotational speed $\omega1$ of an input shaft 6 and of the associated, i.e. input pulley 1) and of a transmission output speed $\omega2$ (i.e. the rotational speed $\omega2$ of an output shaft 7 and of the associated, i.e. output pulley 2). The clamping forces F1, F2 and thus also the normal force components Fn1, Fn2 thereof are realised by exerting a respective hydraulic cylinder pressure P1, P2 in the piston/cylinder-assembly associated with the axially moveable discs 4 of a respective pulley 1, 2. This type of transmission and its operation and control are all well known in the art.

In FIG. 2 an example of the drive belt 3 shown in a longitudinal cross-section thereof. The drive belt 3 of FIG. 2 is of the known, so-called pushbelt or Van Doorne type. The pushbelt 3 comprises an endless tensile body 32, which is composed of two sets of a number of mutually nested, i.e. radially stacked, flat metal rings 33, and a number of metal segments 31, the so-called transverse elements 31 of the belt 3. The sets of rings 33 are each mounted in a respective recess or slot 34 of the transverse elements 31, allowing the elements 31 to slide along the circumference of the tensile body 32. Each such slot 34 is provided on and opens towards a lateral side of the transverse element 31 in-between an effectively trapezoid-shaped lower part 35 and a more or less arrow-head shaped upper part 36 thereof. These upper and lower parts 35 and 36 are interconnected via a central pillar part 37 of the transverse element 31. The transverse elements 31 of the belt 3 arrive into contact with the pulleys 1 and 2 during operation of the CVT through lateral contact or friction surfaces 38 that are normally provided with a profile of alternating ridges and grooves (not shown).

It is, amongst others, known to control the level of the above-mentioned clamping forces F1, F2 to the force levels that are respectively required to transmit a driving torque to be transmitted by the CVT. A favourable control method is provided by the non pre-published international patent application number EP2008/053548, which method is illustrated in FIG. 3 and is elucidated in the below in the preferred embodiment thereof.

The currently considered control method involves the parameters of the speed ratio $\omega1/\omega2$ and the normal force Fn2 of the output pulley 2, the latter as represented by (i.e. directly proportional to) the hydraulic cylinder pressure P2 exerted in the piston/cylinder-assembly of the output pulley 2, hereinafter referred to as the output pulley pressure P2. Hereto, typically requires three sensors 11, 12 and 13 are required that are illustrated in FIG. 3. A first sensor 11 detects the transmission input speed $\omega1$ and generates a respective first speed parameter signal SS1 (e.g. an electric current, voltage, frequency and/or amplitude) that is proportional thereto. A second sensor 12 detects the transmission output speed $\omega2$ and generates a respective second speed parameter signal SS2 that is proportional thereto. A third sensor 13 detects the output pulley pressure P2 and generates a respective output pressure parameter signal PS2 that is proportional thereto. Indeed, this third sensor 13 may potentially be dispensed with, since the output pulley pressure P2 can usually be approximated fairly accurately by calculation, e.g. based on a pressure valve activation signal and the transmission output speed $\omega2$, however, for realising optimum control accuracy and operational reliability the use of the third sensor 13 is to be preferred.

Next, in block I of the control scheme, a transmission speed ratio signal RS is generated that is proportional to the ratio SS1/SS2 between the first speed signal SS1 and the second speed signal SS2 respectively.

Next, in block II, a signal component of a desired frequency or range of frequencies is generated based on both the transmission speed ratio signal RS and the output pressure signal PS2. More specifically, both said signals RS and PS2 are separately passed through a so-called band pass filter that filters out (i.e. allows to pass to the next block III) such signal component, in this particular example the 5 Hz frequency component. These filtered signals are hereinafter referred to as the filtered speed ratio signal FRS and the filtered output pressure signal FPS2 respectively.

Next, in block III, a multiplication signal MS is generated that is proportional to the multiplication FRS*FPS2 of the filtered speed ratio signal FRS and the filtered output pressure signal FPS2. It is this multiplication signal MS or at least a characteristic thereof that is subsequently used to control the CVT, in particular to control the output pulley pressure P2, in which case the input pulley pressure P1 is obtained as a consequence of maintaining a desired transmission speed ratio dRS. To this end an appropriate control action $\Delta$P2 is generated in block IV, which action $\Delta$P2 consists of either increasing "↑", maintaining "↔" or decreasing "↓" the current level of the output pulley pressure P2. Said characteristic can simply be the sign of the multiplication signal MS (i.e. positive, negative or zero), but preferably the (magnitude of the) control action $\Delta$P2 is generated in relation to magnitude of multiplication signal MS that may be obtained by passing the multiplication signal MS through a low pass filter having an upper threshold frequency that is lower than the said target frequency of—in this example—5 Hz of the band pass filter applied to the transmission speed ratio signal RS and the output pressure signal PS2, e.g. only 3 Hz.

The physical behaviour of the CVT whereon the currently considered control method relies is illustrated in FIG. 4. The curve S in the graph of FIG. 4, which is denoted the slip curve S hereinafter, provides the dependency between the transmission parameters of the speed ratio $\omega1/\omega2$ and of the normal force as represented by the output pulley pressure P2 for a constant driving torque and a constant quotient between the effective normal forces applied in the respective pulley-belt contacts. Such behaviour and the slip curve S result from the combination of two, mutually counteracting physical effects.

On the one hand, as the output pulley pressure P2 is increased, the speed ratio $\omega1/\omega2$ shows the tendency to also increase and vice versa, which behaviour is indicated in FIG. 4 by the dashed line and which behaviour is attributed to the elastic deformation of transmission parts, such as the pulley discs 4, 5, the pulley shafts 6, 7, the drive belt 3 and a hydraulic system of the transmission that generates and controls the said pulley pressures P1, P2 (not shown). Accordingly, also an elastic deformation of the said piston/cylinder-assembly is considered relevant in this respect.

On the other hand, as the output pulley pressure P2 is decreased, the speed ratio $\omega1/\omega2$ shows the tendency to increase instead and vice versa, which latter behaviour is indicated in FIG. 4 by the dotted line and may be attributed to a mutual movement or slip in the frictional contact between the pulleys and the drive belt, which slip rapidly tends towards infinity below a certain level of the output pulley pressure P2 and above such level tends towards zero at a more gradual rate. In combination the latter two physical effects thus produce a mutual dependency between the output pulley pressure P2 and the speed ratio $\omega1/\omega2$, as represented by the slip curve S in FIG. 4, that shows a minimum value of the speed ratio $\omega1/\omega2$ at a specific level of the output pulley pressure P2, at which specific level very little, if not minimal, friction losses occur.

In FIG. 4 also the effect of a -for example- sinusoidal variation, i.e. a pressure excitation $\delta$P2 of the output pulley pressure P2 on the speed ratio $\omega1/\omega2$ is indicated. Indeed, in the currently considered, preferred embodiment of the known control method, such output pulley pressure excitation $\delta$P2 is actively induced at a frequency corresponding to the filter frequency of the band pass filter of block II and preferably with an amplitude that is small in comparison with the effective level of the output pulley pressure P2, e.g. amount to only 10% or less. From FIG. 4 it appears that for a comparatively low level of the output pulley pressure P2 (i.e. on the left side of the slip curve S), a sinusoidally oscillating output pulley pressure excitation $\delta$P2 results in a speed ratio response oscillation $\delta[\omega1/\omega2]$-I of opposite sign, such that the said multiplication of these parameter oscillations δP2, δ[ω1/ω2], i.e. of the relevant parameter signals FPS2 and FRS thereof in block III, yields a negative multiplication parameter value (i.e. negative multiplication signal MS). Instead, for a comparatively high level of the output pulley pressure P2 (i.e. more towards the right side of the slip curve S), the relevant pressure excitation δP2 results in a speed ratio response δ[ω1/ω2]-h of the same sign, such that the said multiplication yields a positive value. Analogously, in the minimum M of the slip curve S hardly any speed ratio oscillation δ[ω1/ω2] will occur in response to the said relevant pressure excitation δP2, such that the said multiplication yields a value of, or at least very close to, zero. Accordingly, in these circumstances, the said appropriate control action ΔP2 would be to raise the current output pulley pressure P2 if the said multiplication yields a negative value, to lower the current output pulley pressure P2 if the said multiplication yields a positive value and to leave the output pulley pressure P2 unchanged if the said multiplication yields a zero, or at least a negligible value.

It may be appreciated from the above that the currently considered control method relies on a varying correlation between the, in this example, output pulley pressure oscillation δP2 and the speed ratio oscillation δ[ω1/ω2]. Although such correlation indeed exists and the said control method succeeds very well in controlling the output pulley pressure P2 and, consequently, the said clamping forces F1, F2, it has been observed in practice that the controlled output pulley pressure P2 can be slightly high in relation to the said driving torque, at least when taking the (optimum) efficiency of the transmission as the defining criterion. This observation was linked to a time delay or phase-shift, i.e. phase difference, that was found to occur between the said parameter oscillations δP2, δ[ω1/ω2] even when (virtually) no slip occurs between the drive belt 3 and the pulleys 1, 2. This phase-shift appears to be caused by the inherent inertia and/or elasticity of certain parts or components of the transmission, such as the pulleys 1, 2, in particular the pulley discs 4, 5, the drive belt 3 and the hydraulic control system (not shown) thereof.

In FIG. 5 it is illustrated how such inherent phase-shift affects the functioning of the currently considered control method. In graph A of FIG. 5 the said filtered output pressure signal FPS2, which represents the forced output pulley pressure oscillation δP2, is plotted as a function of (elapsed) time t. In graph B of FIG. 5 the said filtered speed ratio signal FRS, which represents the measured speed ratio oscillation δ[ω1/ω2] that occurs in response to the output pulley pressure oscillation δP2, however delayed in time by the said inherent phase-shift Δϕ$_1$, is plotted. In graph C of FIG. 5 the magnitude of the said multiplication signal MS, which results from the low-pass filtering of the multiplication of the FPS2 and FRS signals of graphs A and B, is plotted as a function of the inherent phase-shift Δϕ in a practical range thereof. Graph C thus illustrates the substantial impact of the inherent phase-shift Δϕ on the magnitude of the said multiplication signal MS.

It may thus be considered advantageous in terms of the control accuracy to compensate for the inherent phase-shift Δϕ in the currently considered control method, or in any other control method that relies on the forced oscillation of a pulley pressure P1 or P2 normal force as well. According to the invention such may be realised in a very practical and universal manner by forcing both normal forces Fn1 and Fn2 to oscillate, preferably at the same frequency. In other words, in the context of the currently considered control method, not only the output pulley pressure P2 is oscillated (δP2), but also the hydraulic cylinder pressure P1 exerted in the piston/cylinder-assembly of the input pulley 1, i.e. the input pulley pressure P1, is actively oscillated (δP1).

In the above manner, the inherent phase-shift Δϕ can partly or even completely be compensated for. For a given output pulley pressure oscillation δP2 the input pulley pressure oscillation δP1 is then empirically determined to realise such compensation as best as possible. More in particular, either one or both of the parameters of oscillation amplitude and oscillation phase (relative to the phase of the output pulley pressure oscillation δP2) of the input pulley pressure oscillation δP1 can be varied for such purpose.

In the graph A of FIG. 6 the synchronous oscillation of the input pulley pressure δP1 and the output pulley pressure δP2 in accordance with the invention is illustrated and in graph B of FIG. 6 the corresponding filtered speed ratio signal FRS is plotted. In the example of FIG. 6 the speed ratio ω1/ω2, as represented by the filtered speed ratio signal FRS, follows the oscillation of the output pulley pressure δP2 without any time delay as desired, i.e. the said inherent phase-shift Δϕ$_1$ has been favourably reduced to zero. In the example of FIG. 6 the amplitude of the input pulley pressure oscillation δP1 is chosen at about 75% of the amplitude of the output pulley pressure oscillation δP2, whereas the phase of the input pulley pressure oscillation δP1 precedes the output pulley pressure oscillation δP2 by 30 degrees, i.e. by about twice the value of the inherent phase-shift Δϕ$_1$. It is, however, noted that FIG. 6 only serves as an example of the present invention. In practice situations could conceivably occur wherein the said inherent phase-shift Δω$_1$ is compensated for by an input pulley pressure oscillation δP1 that is completely identical to the output pulley pressure oscillation δP2, i.e. in terms of not only its frequency, but also the said amplitude and (relative) phase thereof.

The invention claimed is:

1. A method for controlling a normal force in a frictional contact of a continuously variable transmission comprising an input pulley and an output pulley where between an endless transmission means is arranged that is held between and in frictional contact with two pulley discs of each respective pulley under the influence of a respective normal force, wherein, as part of the control method, the normal force at one pulley is actively oscillated, wherein a resulting oscillation of one of, or a ratio or difference between both of, a rotational speed of the input pulley and a rotational speed of the output pulley is determined and wherein at least one normal force is controlled in dependency on a correlation between the said active oscillation and the said resulting oscillation, characterized in that, the method comprises a calibration step wherein a phase difference between the said active oscillation and the said resulting oscillation is determined.

2. The method according to claim 1, characterized in that, the calibration step is executed substantially without slip in the said frictional contact, i.e. when the said normal force in the said frictional contact at the one pulley is large in relation to a friction force therein, e.g. when no torque is being transmitted by the transmission.

3. The method according to claim 2, characterized in that, either one or all of:
   the said one of, or the ratio or difference between both of, the rotational speed of the input pulley and the rotational speed of the output pulley,
   an electric signal representing the one of, or the ratio or difference between both of, the rotational speed of the input pulley and the rotational speed of the output pulley,
   an electric signal representing the normal force oscillation at the one pulley and the said correlation between the said active oscillation and the said resulting oscillation, is adapted in dependency on the determined phase difference.

4. The method according to claim 2, characterized in that, an electric signal representing the said one of, or the ratio or difference between both of, the rotational speed of the input pulley and the rotational speed of the output pulley and/or an electric signal representing the said normal force oscillation at the one pulley is/are adapted by advancing in relation to time the former electric signal relative to the latter, i.e. normal force signal by an amount corresponding to the determined phase difference, preferably by delaying the said normal force signal.

5. The method according to claim 2, wherein, as part the control method, an electric signal representing the said one of, or the ratio or difference between both of, the rotational speed of the input pulley and the rotational speed of the output pulley and/or an electric signal representing the said normal force oscillation at the one pulley are mutually multiplied to generate an electric multiplication signal, characterized in that, the multiplication signal is adapted by adding an offset thereto in relation to the determined phase difference, preferably the multiplication signal is off-set by an amount corresponding to the determined phase difference.

6. A method for controlling a normal force in a frictional contact of a continuously variable transmission comprising an input pulley and an output pulley where between an endless transmission means is arranged that is held between and in frictional contact with two pulley discs of each respective pulley under the influence of a respective normal force, in particular according to claim 2, wherein, as part the control method, the normal force at one pulley is actively oscillated, characterized in that, the normal force at the respective other one pulley is actively oscillated.

7. The method according to claim 6, characterized in that the respective normal forces are oscillated at mutually corresponding frequencies.

8. The method according to claim 1, characterized in that, either one or all of:

the said one of, or the ratio or difference between both of, the rotational speed of the input pulley and the rotational speed of the output pulley, an electric signal representing the one of, or the ratio or difference between both of, the rotational speed of the input pulley and the rotational speed of the output pulley, an electric signal representing the normal force oscillation at the one pulley and the said correlation between the said active oscillation and the said resulting oscillation, is adapted in dependency on the determined phase difference.

9. The method according to claim 1, characterized in that, an electric signal representing the said one of, or the ratio or difference between both of, the rotational speed of the input pulley and the rotational speed of the output pulley and/or an electric signal representing the said normal force oscillation at the one pulley is/are adapted by advancing in relation to time the former electric signal relative to the latter, i.e. normal force signal by an amount corresponding to the determined phase difference, preferably by delaying the said normal force signal.

10. The method according to claim 1, wherein, as part the control method, an electric signal representing the said one of, or the ratio or difference between both of, the rotational speed of the input pulley and the rotational speed of the output pulley and/or an electric signal representing the said normal force oscillation at the one pulley are mutually multiplied to generate an electric multiplication signal, characterized in that, the multiplication signal is adapted by adding an offset thereto in relation to the determined phase difference, preferably the multiplication signal is off-set by an amount corresponding to the determined phase difference.

11. A method for controlling a normal force in a frictional contact of a continuously variable transmission comprising an input pulley and an output pulley where between an endless transmission means is arranged that is held between and in frictional contact with two pulley discs of each respective pulley under the influence of a respective normal force, in particular according to claim 1, wherein, as part the control method, the normal force at one pulley is actively oscillated, characterized in that, the normal force at the respective other one pulley is actively oscillated.

12. The method according to claim 11, characterized in that the respective normal forces are oscillated at mutually corresponding frequencies.

13. The method according to claim 12, characterized in that a phase difference is provided between a respective phase of the respective normal force oscillations.

14. The method according to claim 13, wherein an oscillation of the ratio between a rotational speed of the input pulley and a rotational speed of the output pulley is determined, wherein the normal force at the one pulley is controlled in dependency on a correlation between the oscillation of the said speed ratio and the oscillation of the said normal force at the one pulley and wherein a phase difference between the oscillation of the said normal force and the oscillation of the said speed ratio is determined, characterized in that the phase difference between a respective phase of the respective normal force oscillations is set to correspond to twice the value of the determined phase difference.

15. The method according to claim 11, characterized in that a phase difference is provided between a respective phase of the respective normal force oscillations.

16. The method according to claim 15, wherein an oscillation of the ratio between a rotational speed of the input pulley and a rotational speed of the output pulley is determined, wherein the normal force at the one pulley is controlled in dependency on a correlation between the oscillation of the said speed ratio and the oscillation of the said normal force at the one pulley and wherein a phase difference between the oscillation of the said normal force oscillation and the of the said speed ratio is determined, characterized in that the phase difference between a respective phase of the respective normal force oscillations is set to correspond to twice the value of the determined phase difference.

17. The method according to claim 11, characterized in that, the respective normal forces are oscillated with mutually corresponding amplitudes.

18. The method according to claim 1, characterized in that, the said one pulley is connected to a driven wheel of a motor vehicle wherein the transmission is applied and the respective other one of the pulleys is connected to an engine of the motor vehicle.

* * * * *

UNITED STATES PATENT AND TRADEMARK OFFICE
CERTIFICATE OF CORRECTION

PATENT NO. : 8,600,634 B2
APPLICATION NO. : 13/119999
DATED : December 3, 2013
INVENTOR(S) : Van Der Sluid et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 428 days.

Signed and Sealed this
Twenty-second Day of September, 2015

Michelle K. Lee
*Director of the United States Patent and Trademark Office*